United States Patent [19]

Liedholz

[11] 3,863,066
[45] Jan. 28, 1975

[54] VOLTAGE RUN-DOWN CIRCUIT
[75] Inventor: Gerhard A. Liedholz, Miami, Fla.
[73] Assignee: Coulter Electronics, Inc., Hialeah, Fla.
[22] Filed: Apr. 16, 1973
[21] Appl. No.: 351,794

[52] U.S. Cl............. 250/214 R, 250/565, 356/179, 307/235 R, 307/311
[51] Int. Cl. ........................................ H01j 39/12
[58] Field of Search ........... 250/214, 218, 206, 564, 250/565; 328/146, 147, 2; 307/235 R, 311; 356/179, 205

[56] References Cited
UNITED STATES PATENTS
| | | | |
|---|---|---|---|
| 3,353,033 | 11/1967 | Gilbert............................ | 328/147 X |
| 3,548,206 | 12/1970 | Ogle et al. ......................... | 307/231 |
| 3,566,133 | 2/1971 | Dorman, Jr. et al............ | 250/214 R |
| 3,622,795 | 11/1971 | Dorman, Jr......................... | 250/576 |
| 3,632,209 | 1/1972 | Kingman......................... | 356/205 X |
| 3,703,336 | 11/1972 | Rosse et al......................... | 250/565 |

Primary Examiner—Walter Stolwein
Attorney, Agent, or Firm—Silverman & Cass, Ltd.

[57] ABSTRACT

The voltage run-down circuit comprises first and second circuit branches connected in parallel and adapted to be connected between the input of a comparator in a photometric analysis system and a common conductor for the system. A capacitor which stores a reference voltage is situated in the first branch and a resistance is situated in the second branch. A resistance is also situated in the first branch in series with the capacitor to provide an initial step-down of the voltage decay of the reference voltage stored in the voltage run-down circuit when a test voltage from a photoresponsive device is applied to another input of the comparator and the capacitor is permitted to discharge, thereby to compensate for inadequate high frequency response in the comparator.

3 Claims, 2 Drawing Figures 3,863,066

VOLTAGE RUN-DOWN CIRCUIT

CROSS-REFERENCE TO RELATED APPLICATIONS AND PATENTS

The subject matter of this application is related to subject matter disclosed in U.S. application Ser. No. 242,049 filed on Apr. 7, 1972 and now issued to U.S. Pat. No. 3,752,995 and in U.S. Pat. Nos. 3,566,133 and 3,622,795. The above identified application and patents are assigned to the assignee of the present application. The disclosures of the above identified application and patents are incorporated herein by reference and reference may be had to the application and patents for a more detailed explanation of the manner in which the voltage run-down circuit is utilized.

BACKGROUND OF THE INVENTION

This invention relates to a voltage run-down circuit and particularly to a voltage run-down circuit which has means therein for compensating for inadequate high frequency response in an active electronic device such as a comparator. The voltage run-down circuit with such compensation means therein is particularly useful in a photometric analysis system wherein the discharge of a capacitor having a reference voltage thereon is applied to one input of a comparator and a test voltage is applied to the other input of the comparator. The output of the comparator is a signal directly related to the logarithm of the ratio of the reference voltage over the test voltage. This output signal can be converted directly to concentration units and shown on a visual display device.

Heretofore, voltage run-down circuits have been utilized in photometric analysis systems and particularly in the photometer disclosed in U.S. Pat. No. 3,752,995 referred to above. In this prior patent the problem of compensating for inadequate high frequency response of an operational amplifier was considered and a compensation arrangement for the voltage run-down circuit was provided. This compensation arrangement included a resistance and capacitance connected in parallel between the voltage run-down circuit and the input to the comparator-operational amplifier. The compensation arrangement also included the provision of a capacitor connected between control circuitry and the input to the operational amplifier. The voltage run-down circuit to be described in more detail hereinafter provides a much simpler means for compensating for the inadequate high frequency response in a comparator-operational amplifier.

SUMMARY OF THE INVENTION

According to the invention there is provided a voltage run-down circuit comprising first and second circuit branches connected in parallel, a capacitor situated in the first branch, a resistance situated in the second branch and a compensating resistance situated in the first branch in series with the capacitor.

DESCRIPTION OF THE PREFERRED EMBODIMENT

Figure 1:
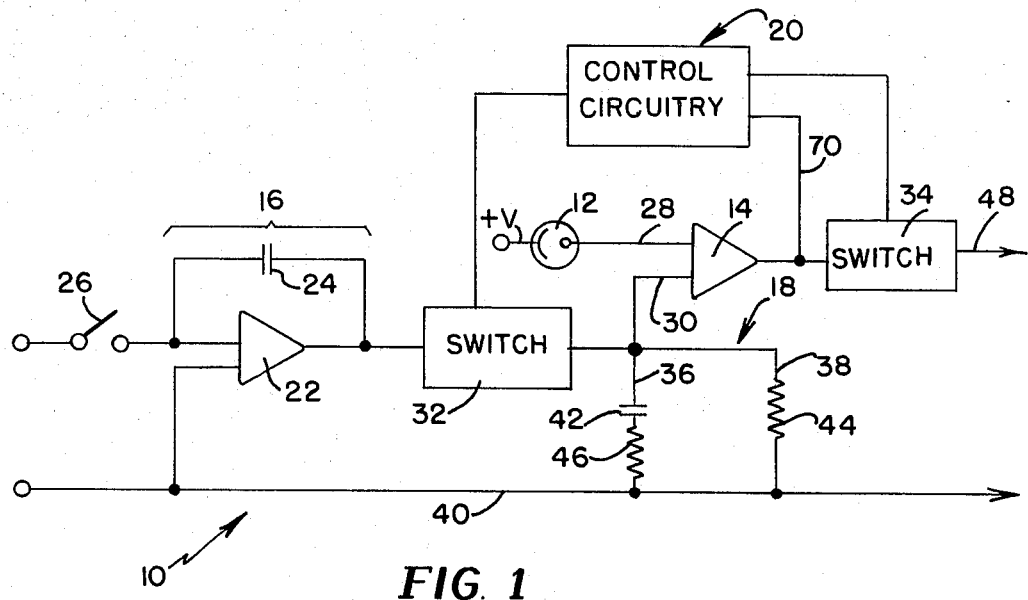
FIG. 1 is a schematic diagram of a circuit utilizing the voltage run-down circuit to be described hereinafter.

In FIG. 1 is shown schematically a substantial portion of the circuitry for a photometric analysis system. The circuitry shown is identified by the reference numeral 10 and includes a photoresponsive device 12, a comparator 14, a reference voltage storing circuit 16, a voltage run-down circuit 18 and control circuitry 20. As shown, the reference voltage storing circuit 16 includes an operational amplifier 22 and a capacitor 24 connected between one input of the amplifier 22 and the output of the amplifier 22. As so connected, the operational amplifier 22 and the capacitor 24 form an integrator which integrates and holds a voltage applied thereto. In the use of the photometer of which the circuitry 10 forms a part, a blank solution is inserted in the path of light from a light source to a photoresponsive device much the same as the device 12. The voltage generated from the light passing through the blank solution is then applied through the switch 26 to the integrator or voltage storing circuit 16. The voltage stored in the storage circuit 16 can then be referred to as a blank voltage or a reference voltage.

Now the circuit 10 is ready for use in analyzing samples. In particular, it is ready for use in analyzing substances in a liquid. This is done by placing a test tube or cell containing the liquid sample in the path of light from a light source to the photoresponsive device 12. The amount of light received by the device 12 will generate a voltage which is applied to one input 28 of the comparator 14. Another input 30 of the comparator 14 is connected to the voltage run-down circuit 18.

At the same time, the control circuitry 20 maintains an electronic switch 32 closed and another electronic switch 34 open. The electronic switch 32 is connected between the output of the amplifier 22 and the voltage run-down circuit 18. While the switch 32 is closed the voltage stored in the voltage storing circuit 16 is applied to the voltage run-down circuit to charge a capacitor therein.

As shown, the voltage run-down circuit includes first and second circuit branches 36 and 38 connected between the input 30 of the comparator 14 and a common conductor 40 for the photometric analysis system. The first branch 36 has a capacitor 42 therein constituting the run-down capacitor and the branch 38 has a resistance 44 therein through which the capacitor 42 is discharged. Also, and in accordance with the teachings of the present invention, a compensating resistance 46 is situated in the branch 36 in series with the capacitor 42.

In the operation of the circuit 10 the control circuitry 20 is operated to cause the switch 32 to be opened and the switch 34 to be closed. At that point in time the capacitor 42 starts to discharge and a logic 1 output from the comparator 14 is applied through the switch 34 to a conductor 48 leading to a visual display device such as a run-up digital counter. So long as their is a logic 1 signal on the conductor 48 the digital run-up counter will count and will stop counting when the logic 1 signal is terminated. This logic 1 signal is terminated when the voltage on the input 30 of the comparator 14 falls below the test voltage from the photoresponsive device 12 on the input 28 of the comparator 14.

Assuming for the moment that the compensating resistance 46 was not in the circuit, the voltage on the capacitor 42 would decrease exponentially until it reached the value of the voltage generated by the sample and applied to the input 28. To better appreciate this phenomenon reference is made to graph A of FIG. 2 where the charging up of the capacitor to the reference voltage is illustrated by the curve 50, the reference voltage is represented by the line 52 and the test voltage is represented by the line 54. At the time $t_0$ when the control circuit is operated to open the switch 32 and close the switch 34 the voltage on the capacitor 42 (without the resistance 46 in the run-down circuit 18) starts to decrease as the charge in the capacitor 42 is dissipated through the resistor 44. The curve of the voltage on the discharging capacitor is identified by the reference numeral 56 in graph A of FIG. 2. Ideally, and as shown in graph C of FIG. 2, a logic 1 signal 58, which will appear at the output of the comparator 14, starts at time $t_0$ and ends at time $t_1$ when the voltage on the capacitor 42 as represented by the curve 56 falls below the test voltage represented by the line 54 in graph A. The logic signal 58 is directly related to the log of the difference between the reference voltage as represented by the line 52 and the test voltage as represented by the line 54. However, the comparator 14 does not have adequate high frequency response. Stated otherwise, there is a slewing rate in the comparator 14 which results in a delay of the termination of the logic 1 signal at the output of the comparator 14. As a result, the logic output signals generated by various test voltages applied to the input 28 of the comparator 14 will be longer than they should be. In this respect, the comparator 14 functions as if the decaying voltage curve for the capacitor 42 was slewed or offset as shown by the curve 60 in graph A of FIG. 2. Thus, without the resistance 46 in the voltage run-down circuit 14 the actual logic output signal from the comparator 14 will be the logic 1 output signal 62 shown in graph B of FIG. 2 which ends at a time $t_2$.

In accordance with the teachings of the present invention the resistance 46 is added to the branch 36 of the voltage run-down circuit 18 to provide an immediate initial voltage drop when the switch 32 is opened. This voltage drop is shown graphically at $V_d$ in graph A of FIG. 2. As a result the voltage on the upper terminal of the capacitor 42 starts to decay not from the reference voltage as shown by the line 52 but from a lower voltage represented by the line 64 in graph A of FIG. 2. The resulting decaying voltage is indicated or shown by the curve 66 in graph A of FIG. 2.

Figure 2:
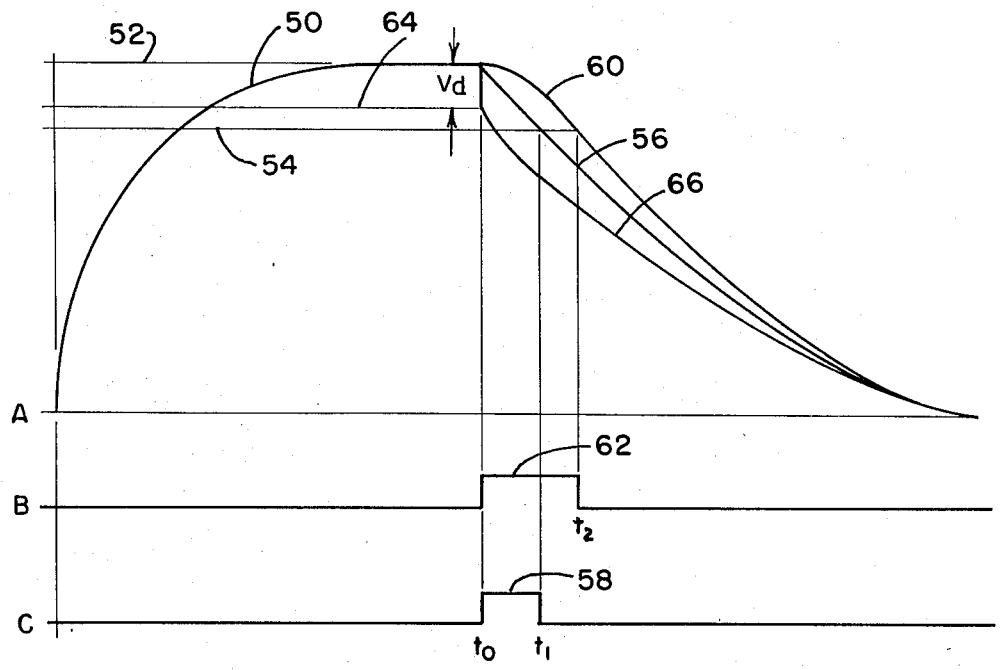
FIG. 2 is a diagram consisting of a series of graphs all on the same time scale illustrating various signals or pulses which appear at different points in the circuit shown in FIG. 1.

It will be apparent from an examination of graph A of FIG. 2 that the slewing of the curve 66 will result in a curve substantially identical to the curve 56. Looked at in another way, the curve 56 is offset to the left by the addition of the resistance 46, the offset being represented by the curve 66 and the line representing the voltage drop $V_d$ extending between lines 64 and 52. This offset compensates for the slewing or offset to the right represented by the curve 60 and results in the generation of a logic output signal from the comparator 14 substantially identical to the signal 58 shown in graph C of FIG. 2.

It will be noted that there is a conductor 70 connected between the output of the comparator 14 and the control circuitry 20. This conductor will transmit the logic signal from the comparator 14 to the control circuitry and when this signal goes from logic 1 to logic 0 the control circuitry is operated to reclose the switch 32 and to reopen the switch 34 so that the capacitor 42 can be charged again to the reference voltage and the circuit 10 is then enabled to make another voltage comparison on another liquid sample.

It will be appreciated from the foregoing description that the present invention provides a simple and efficient means in a voltage run-down circuit for compensating for inadequate high frequency response or slewing rate in the active elements in a comparator or operational amplifier. Accordingly, the scope of the invention is only to be limited as necessitated by the accompanying claims.

What it is claimed and desired to secure by Letters Patent of the United States is:

1. In a photometric analysis system including a photoresponsive device for generating a voltage related to the light received by the device, a voltage run-down circuit comprising first and second circuit branches connected in parallel, a capacitor in said first branch and a resistance in said second branch, means for charging said capacitor with a reference voltage, and a comparator for comparing a voltage decay of the reference voltage on said capacitor with the voltage generated in the photoresponsive device, the improvement comprising a resistance in said first branch in series with said capacitor to provide an initial voltage stepdown of the decaying reference voltage applied to said comparator thereby to compensate for inadequate high frequency response in said comparator.

2. In a photometric analysis system for generating a signal related to the log of a voltage ratio of a reference voltage over a test voltage generated in a photoresponsive device, said system being of the type including a comparator having first and second inputs, said first input being connectable to the photoresponsive device, a voltage run-down circuit including first and second circuit branches connected in parallel, a capacitor in said first branch and a resistance in said second branch, said voltage run-down circuit being connected between said second input of said comparator and a common conductor for said system and means cyclically connected to said voltage run-down circuit for charging said capacitor to the reference voltage, the improvement comprising a resistance in said first branch in series with said capacitor to provide an initial step-down of the run-down voltage when said capacitor starts to discharge to compensate for inadequate high frequency response in said comparator.

3. In a photometric analysis system for measuring concentration of a substance in a liquid, said system being of the type including a comparator having first and second inputs, a photoresponsive device connected to said first input, a voltage run-down circuit including first and second circuit branches connected in parallel, a capacitor in said first branch and a resistance in said second branch, said voltage run-down circuit being connected between said second input of said comparator and a common conductor for said system, means for storing a reference voltage and means for cyclically applying said reference voltage to said voltage run-down circuit and for cyclically applying the output of the comparator to a measuring device when said reference voltage is not being applied to said voltage run-down circuit and said capacitor thereof is discharging, the output of said comparator being a signal which is related to the log of the voltage difference between the reference voltage and the voltage from the photoresponsive device and which can be directly converted to concentration units, the improvement comprising a resistance in said first branch in series with said capacitor to provide an initial step-down of the run-down voltage when the capacitor starts to discharge to compensate for inadequate high frequency response in said comparator.

* * * * *